US009869440B2

(12) United States Patent
Ahn

(10) Patent No.: US 9,869,440 B2
(45) Date of Patent: Jan. 16, 2018

(54) LAMP FOR VEHICLE WITH ROTATING REFLECTOR AND LIGHT SOURCE POSITIONED OUTSIDE THE REFLECTOR

(71) Applicant: HYUNDAI MOTOR COMPANY, Seoul (KR)

(72) Inventor: Byoung Suk Ahn, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 275 days.

(21) Appl. No.: 14/668,838

(22) Filed: Mar. 25, 2015

(65) Prior Publication Data

US 2016/0123550 A1    May 5, 2016

(30) Foreign Application Priority Data

Nov. 4, 2014    (KR) ........................ 10-2014-0152269

(51) Int. Cl.
| | | |
|---|---|---|
| *F21S 8/10* | (2006.01) | |
| *B60Q 1/068* | (2006.01) | |
| *B60Q 1/12* | (2006.01) | |
| *F21Y 115/30* | (2016.01) | |
| *F21Y 115/10* | (2016.01) | |

(52) U.S. Cl.
CPC ........ *F21S 48/1323* (2013.01); *B60Q 1/0683* (2013.01); *B60Q 1/12* (2013.01); *F21S 48/1145* (2013.01); *F21S 48/1757* (2013.01); *F21S 48/328* (2013.01); *F21Y 2115/10* (2016.08); *F21Y 2115/30* (2016.08)

(58) Field of Classification Search
CPC ....... B60Q 1/068–1/124; F21S 48/1145; F21S 48/1241; F21S 48/115–48/1163
See application file for complete search history.

(56) References Cited

U.S. PATENT DOCUMENTS

| | | | | |
|---|---|---|---|---|
| 2001/0002879 A1* | 6/2001 | Suzuki | ..................... | B60Q 1/12 362/514 |
| 2009/0168447 A1* | 7/2009 | Tseng | ..................... | B60Q 1/076 362/524 |
| 2012/0069593 A1* | 3/2012 | Kishimoto | ............ | B60Q 1/076 362/511 |

(Continued)

FOREIGN PATENT DOCUMENTS

| | | |
|---|---|---|
| JP | 2011-243371 A | 12/2011 |
| JP | 2012-054084 A | 3/2012 |
| JP | 2012-089479 A | 5/2012 |

(Continued)

OTHER PUBLICATIONS

Korean Office Action issued in Korean Application No. 10-2014-0152269, dated Oct. 26, 2016.

(Continued)

*Primary Examiner* — Anh Mai
*Assistant Examiner* — Steven Horikoshi
(74) *Attorney, Agent, or Firm* — McDermott Will & Emery LLP

(57) ABSTRACT

A lamp for a vehicle includes a reflector configured to reflect received light and rotate with respect to at least one rotation axis to control an irradiation angle. A light source is positioned outside the reflector spaced apart from the reflector and is configured to generate light to be incident on the reflector.

7 Claims, 5 Drawing Sheets

(56) References Cited

U.S. PATENT DOCUMENTS

2012/0106178 A1* 5/2012 Takahashi ............ B60Q 1/0035
362/459

FOREIGN PATENT DOCUMENTS

| JP | 2012-099228 A | 5/2012 |
|---|---|---|
| KR | 10-2003-0003971 A | 1/2003 |
| KR | 10-2004-0045523 A | 6/2004 |
| KR | 10-2009-0088631 A | 8/2009 |
| KR | 2014-0042495 A | 4/2014 |

OTHER PUBLICATIONS

Korean Office Action issued in Korean Application No. 10-2014-0152269 dated Apr. 13, 2016.

* cited by examiner

LAMP FOR VEHICLE WITH ROTATING REFLECTOR AND LIGHT SOURCE POSITIONED OUTSIDE THE REFLECTOR

CROSS REFERENCE TO RELATED APPLICATION

The present application claims the benefit of priority to Korean Patent Application No. 10-2014-0152269, filed Nov. 4, 2014, the entire contents of which is incorporated herein for all purposes by this reference.

TECHNICAL FIELD

The present invention relates to a lamp for a vehicle, and more particularly, to a lamp for a vehicle in which a light source and a reflector may be independently installed to diversify an installation layout and improve aiming freedom of the reflector.

BACKGROUND

Generally, a lamp for a vehicle is configured to include a light source which generates light and a reflector which irradiates the light from the light source to front side or back side of a vehicle.

A plurality of reflectors and light sources are installed in one vehicle and the positions thereof are also diverse. Accordingly, to increase installation easiness and production efficiency, the reflector and the light source are generally installed in a fixedly coupled state as one module.

However, the typical method for fixedly coupling the light source with the reflector brings about considerable drawbacks in a layout. That is, the light source needs to have a heat radiating fin having a size which is not ignored to spread heat of the light source, and therefore the installation of the reflector and the light source is limited.

Further, since the reflector and the light source are fixedly coupled integrally, when any of the reflector and the light source is damaged, the overall module needs to be replaced, which may lead to the reduction in cost efficiency.

The matters described as the related art have been provided only for assisting in the understanding for the background of the present invention and should not be considered as corresponding to the related art known to those skilled in the art.

SUMMARY

An object of the present invention is to provide a lamp for a vehicle in which a reflector and a light source may be installed to be separated from each other and independent aiming of the reflector may be implemented.

According to an exemplary embodiment of the present invention, there is provided a lamp for a vehicle, including: a reflector configured to reflect received light and to rotate about at least one rotation axis to control an irradiation angle. A light source is positioned outside the reflector spaced apart from the reflector and is configured to generate light to be incident on the reflector.

The light from the light source may form a set moving path.

In certain embodiments, the light source may generate a laser beam.

In certain embodiments, the lamp may further include: a phosphor disposed in the moving path of the light from the light source and configured to receive light including the light from the light source and output, to the reflector, light having a different wavelength from that of the light from the light source.

In certain embodiments, the moving path of the light from the light source may intersect or be parallel with any one of the rotation axes.

In certain embodiments, the reflector may be configured to rotate with respect to a horizontal rotation axis and a vertical rotation axis.

In certain embodiments, the phosphor may be provided at an intersecting point between the horizontal rotation axis and the vertical rotation axis of the reflector.

In certain embodiments, the lamp may further include a first support configured to be rotatably-coupled with left and right ends of the reflector to form the horizontal rotation axis and a second support configured to be rotatably-coupled with an upper end of the first support at an upper coupled part and with a lower end of the first support at a lower coupled part to form the vertical rotation axis.

In certain embodiments, the lamp may also include: a reflecting body configured to receive the light from the light source and reflect the received light toward a side of the reflector.

In certain embodiments, the lamp may further include: a reflecting body disposed on the vertical rotation axis and configured to reflect the light received from the light source to the phosphor.

In certain embodiments, the light reflected from the reflecting body may be incident on the phosphor along the vertical rotation axis.

In certain embodiments, the light source may be disposed on the vertical rotation axis to irradiate light toward the phosphor, and wherein the upper coupled part or the lower coupled part may be provided with a through hole along the vertical rotation axis so as to allow the irradiated light to be incident on the phosphor.

In certain embodiments, the light source and the reflector may be separate components that can each be installed independently.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Hereinafter, a lamp for a vehicle according to exemplary embodiments of the present invention will be described with reference to the accompanying drawings.

Figure 1:
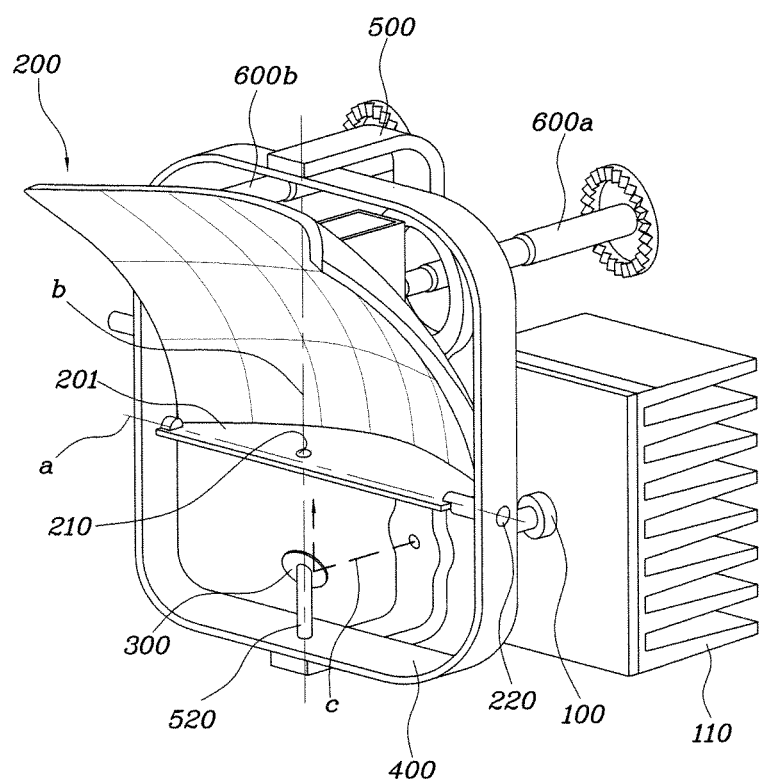
FIG. 1 is a perspective view of a lamp for a vehicle according to a first exemplary embodiment of the present invention.
Figure 2:
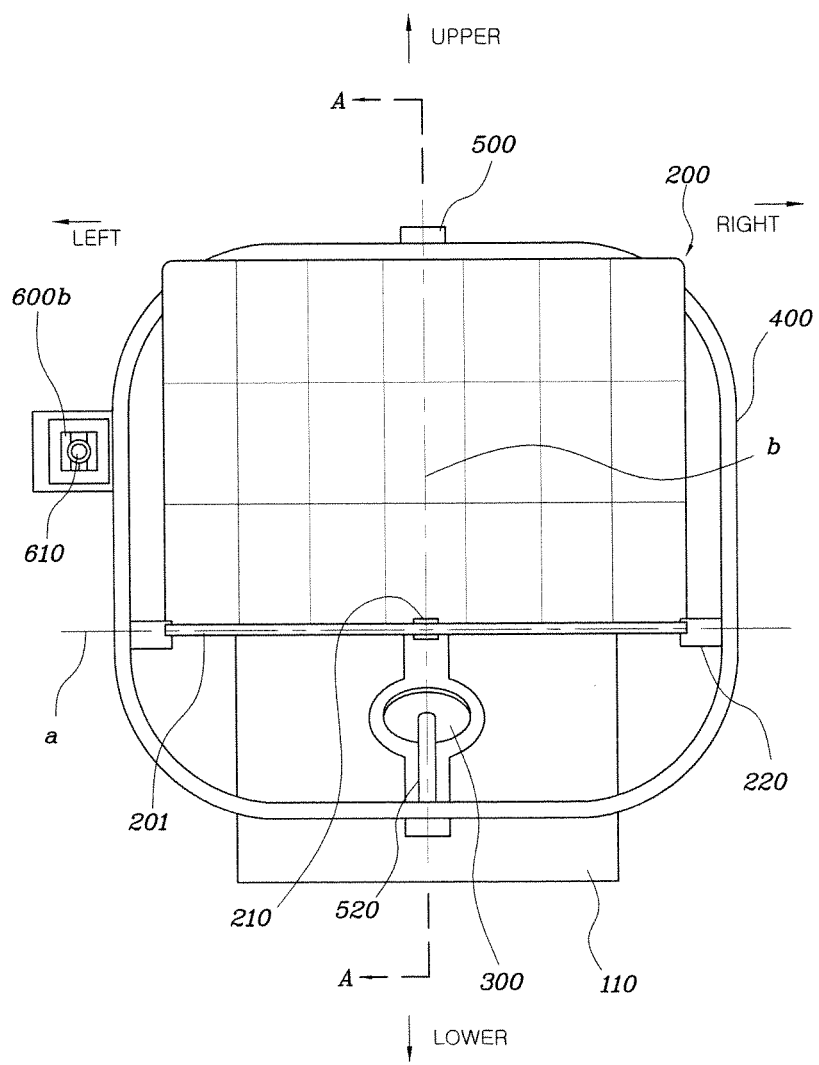
FIG. 2 is a front view of the lamp for a vehicle according to the first exemplary embodiment of the present invention.
Figure 3:
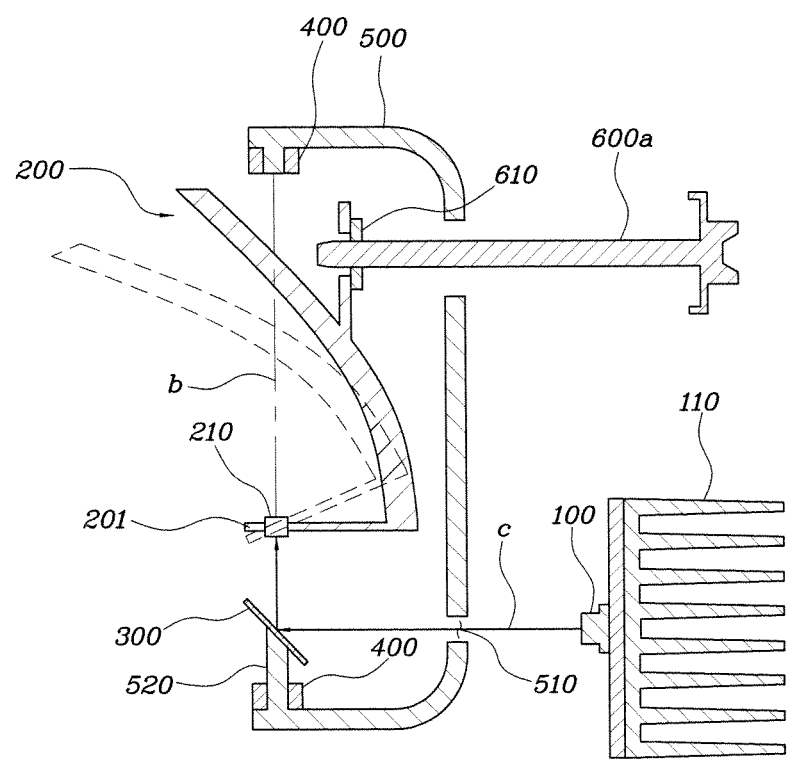
FIG. 3 is a side cross-sectional view taken along line A-A of FIG. 2.

FIG. 1 is a perspective view of a lamp for a vehicle according to a first exemplary embodiment of the present invention, FIG. 2 is a front view of the lamp for a vehicle according to the first exemplary embodiment of the present invention, and FIG. 3 is a side cross-sectional view taken along line A-A of FIG. 2. The lamp for a vehicle according to the first exemplary embodiment of the present invention includes a reflector 200 configured to reflect received light and include at least one rotation axis a or b to control an irradiation angle and a light source 100 configured to be positioned outside the reflector 200 to be spaced apart from the reflector 200 and generate light incident on the reflector 200.

In detail, the light from the light source 100 may form a moving path which is set to be similar to a laser beam. Preferably, the light source 100 may generate a laser beam. To this end, the light source 100 is preferably a laser diode. However, the present invention is not necessarily limited thereto. In addition, an apparatus which may generate light having straightness similar to the laser beam and moving along a predetermined path or a light source apparatus which intensively irradiates light to one set point may also be used. Extensively, a general lamp, for example, an LED and a general lamp having a bulb type may also be used. The first exemplary embodiment and the second exemplary embodiment to be described below describe the case in which a laser diode is used as the light source 100, but light from the light source 100 to be used in exemplary embodiments to be described below is not limited to the laser beam and may be applied to light from various lamps.

Further, the light source 100 is preferably coupled with a separate cooling fin 110 for cooling high heat generated from the light source 100 and the light source 100 and the cooling fin 110 are separated from the reflector 200 as a separate module and may be independently provided. That is, the reflector 200 and the light source 100 may be installed not to be coupled with each other. Alternatively, considering a designer's intention or a layout of a lamp housing, the reflector 200 and the light source 100 may be formed to be coupled with each other.

Meanwhile, as illustrated in FIGS. 1 to 3, a horizontal rotation axis a and a vertical rotation axis b may be set so that the reflector 200 may rotate about either axis. The reflector 200 may be further provided with a first support 400 configured to be rotatably-coupled with left and right ends of the reflector 200 to form the horizontal rotation axis a and a second support 500 rotatably-coupled with upper and lower ends of the first support 400 to form the vertical rotation axis b. According to the present exemplary embodiment, a direction in which the reflector 200 reflects and irradiates the light from the light source 100 may be determined based on the direction in which the front of the reflector 200.

The horizontal rotation axis a and the vertical rotation axis b are virtual rotation axes. In certain embodiments, the horizontal rotation axis a may be implemented by a pair of horizontal axis protrusions 220 which is each formed at left and right ends of the reflector 200 to rotatably couple the reflector 200 with corresponding ends of the first support 400. In certain embodiments, the vertical rotation axis b may be implemented by a pair of vertical axis protrusions 520 which is each formed at upper and lower ends of a second support 500 to rotatably couple the upper and lower ends of the second support 500 with corresponding upper and lower ends of the first support 400.

Alternatively, in certain embodiments, the horizontal axis protrusion 220 may not be formed at the reflector 200 but at the first support 400 to rotatably couple the first support 400 with the reflector 200. Similarly, in certain embodiments, the vertical axis protrusion 520 may not be formed at the second support 500 but rather at the first support 400 to rotatably couple the first support 400 with the second support 500.

In other embodiments, the horizontal axis protrusion 220 and the vertical axis protrusion 520 may not have a protrusion form and include an actually bar-shaped rotation axis, thereby implementing the horizontal rotation axis a and the vertical rotation axis b.

In addition, according to another exemplary embodiment of the present invention, the reflector 200 and the first support 400 may be formed to be coupled with each other by the vertical axis protrusion and the first support 400 and the second support 500 may also be formed to be coupled with each other by the horizontal axis protrusion.

A member coupled with each axis protrusion 220 and 520 is provided with a coupling hole, and thus each axis protrusion 220 and 520 may be rotatably coupled with each other. However, the reflector 200 and the first support 400 and the first support 400 and the second support 500 are not necessarily protrusion-hole coupled with each other. Alternatively, coupling using a bearing, or any other coupling method for relatively rotating them may be used. Therefore, examples of coupling methods between the reflector 200 and the first support 400 and between the first support 400 and the second support 500 may be diverse.

Further, the first support 400 and the second support 500 may have a frame shape, but the shape not necessarily limited thereto and therefore may be various types of supports such as a panel and a bracket. Further, the second support 500 may be fixedly coupled with a housing which is connected to a vehicle body, and thus the first support 400 may be fixed to the reflector 200.

Meanwhile, an intersecting point between the horizontal rotation axis a and the vertical rotation axis b in the reflector 200 may be further provided with a phosphor 210 which receives the light from the light source 100 and outputs light having a wavelength different from that of the light from the light source 100 to the reflector 200.

When receiving a laser beam having a wavelength generating blue light, the phosphor 210 generates light having a wavelength of yellow light and partially transmits a wavelength of blue light of the laser beam to mix the blue light with the yellow light, thereby generating white light. Further, a color of the phosphor 210 may be variously implemented and the phosphor 210 may also be formed to emit light having other wavelengths by absorbing the entire laser beam without transmission. Emission from the phosphor 210 may be variously implemented.

In certain embodiments, a lower end of the reflector 200 may be provided with an installation panel 201 which is parallel with the horizontal rotation axis a so that the phosphor 210 may be provided at the intersecting point between the horizontal rotation axis a and the vertical rotation axis b. The installation panel 201 is provided to include the horizontal rotation axis a and a position corresponding to the intersecting point may be provided with an insertion hole (no reference numeral) to make the phosphor 210 insert thereinto.

Alternatively, in certain embodiments the installation position of the phosphor 210 and the installation panel 201 may not be provided on the horizontal rotation axis a, but rather on the vertical rotation axis b. It may be variously set depending on the shape of the reflector 200 and an incident direction of light or a designer's intention. Further, the installation panel 201 does not necessarily have a panel form but may have a frame structure or may be formed in any form of structure which may support the phosphor 210.

Meanwhile, a reflecting body 300 reflecting the light received from the light source 100 to the phosphor 210 may be provided on the vertical rotation axis b, in which the reflecting body 300 may be formed in any position and shape which may reflect light to the phosphor 210, but is provided on the vertical rotation axis b under the installation panel 201 and may be provided to make the light incident from the light source 100 be incident to the phosphor 210 along the vertical rotation axis b.

Since a moving path c along which the light from the light source 100 moves is formed along the vertical rotation axis b and the phosphor 210 is provided at the intersecting point between the vertical rotation axis b and the horizontal rotation axis a, as illustrated in FIG. 3, even though the reflector 200 rotates at a predetermined angle based on the vertical rotation axis b or the horizontal rotation axis a, the light from the light source 100 may be continuously incident to the phosphor 210, such that the rotation of the reflector 200 may be made separately from the installation position and the incident direction of the light source 100 and the installation freedom and the configuration freedom of the reflector 200 may be increased.

As described above, in certain embodiments, the moving path c of the light reflected by the reflecting body 300 from the light source 100 may intersect the vertical rotation axis b and may be formed to be parallel with the horizontal rotation axis a. In other embodiments, it may be formed in any different angle to which any different light is incident on the phosphor 210.

Further, as the reflecting body 300 is provided, the position and the irradiation direction of the light source 100, the distance from the reflector 200, and the like may be variously set, thereby simplifying the layout and improving the shape freedom and the installation freedom.

Further, there is no need to use a separate optical fiber, and the like to transmit the light from the light source 100 to the reflector 200, thereby saving installation costs.

Meanwhile, as illustrated in FIG. 3, the lamp for a vehicle may be further provided with a first control part 600a to have an end coupled with an upper end or a lower end of the reflector 200 and push or pull the reflector 200 forward and backward to rotate the reflector 200 forward and backward about the horizontal rotation axis and a second control part 600b configured to have an end coupled with a left or right side of the reflector 200 and push or pull the reflector 200 forward and backward to rotate the reflector 200 about the vertical axis. Preferably, in certain embodiments, the first control part 600a may be coupled with an upper central portion between the left and right of the reflector 200.

Ends of the first control part 600a and the second control part 600b are provided with threads along an outer circumference and the reflector 200 may be provided with nuts 610 of an elastic material which are coupled with the first control part 600a or the second control part 600b, respectively.

The first control part 600a and the second control part 600b may have the ends coupled with the nut 610 in a bar shape and the shape of the first control part 600a and the second control part 600b may be variously set. Since the first control part 600a and the second control part 600b each are biasedly installed at the upper or lower and the left or right of the reflector 200, the first control part 600a or the second control part 600b rotates and thus the reflector 200 may rotate by the bolt-nut coupling.

Further, the nut 610 is made of an elastic material and thus may absorb a bending or a change in a predetermined length of the second control part 600b which occurs when the reflector 200 rotates about the horizontal axis or a bending or a change in a predetermined length of the first control part 600a which occurs when the reflector 200 rotates about the vertical axis, such that the apparatus for controlling the aiming of the reflector 200 without a complex configuration may be implemented.

In addition, the foregoing first control part 600a and second control part 600b are not limited to the above example but may be variously implemented, and therefore the first and second control parts 600a and 600b may have a cylinder form so as to have a varying length or the first and second control parts 600a and 600b may have a length varying by a rotation of a motor in which an eccentric cam is installed or the first and second control parts 600a and 600b are not a length varying type but may be configured to enable the motor to directly rotate the reflector 200 forward and backward or horizontally.

Figure 4:
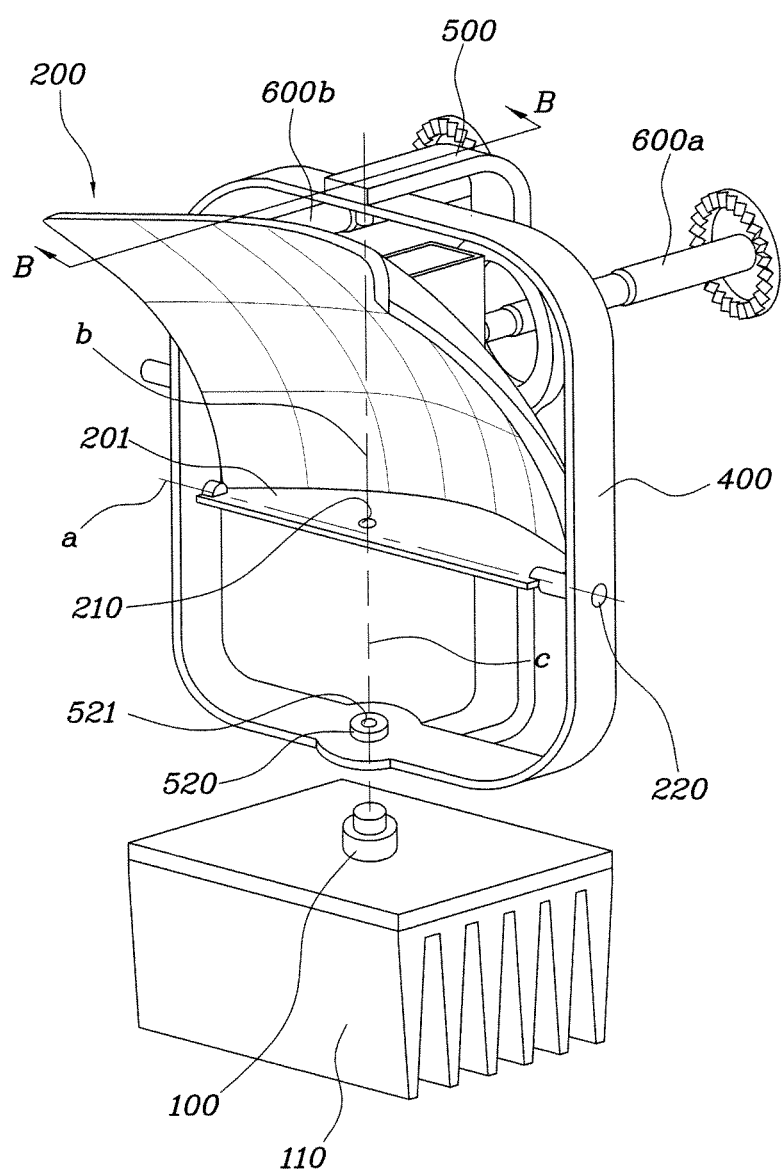
FIG. 4 is a perspective view of a lamp for a vehicle according to a second exemplary embodiment of the present invention.
Figure 5:
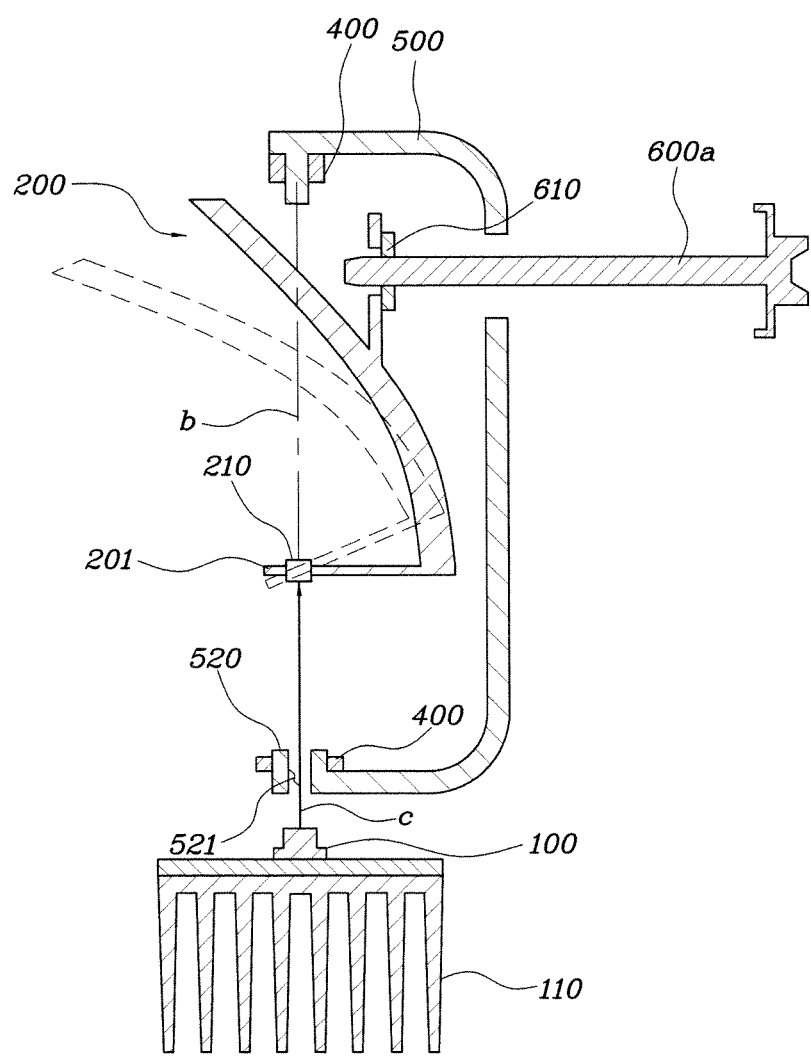
FIG. 5 is a side cross-sectional view taken along line B-B of FIG. 4

Meanwhile, as another exemplary embodiment of the present invention, FIG. 4 is a perspective view of a lamp for a vehicle according to a second exemplary embodiment of the present invention and FIG. 5 is a side cross-sectional view taken along the line B-B of FIG. 4.

The lamp for a vehicle according to the second exemplary embodiment of the present invention has a difference from the first exemplary embodiment of the present invention in that it does not include the reflecting body 300 and directly irradiates the light from the light source 100 to the phosphor 210 but the all of the rest components of the lamp for a vehicle according to the second exemplary embodiment of the present invention including the reflector 200 are configured to be same as or similar to those of the first exemplary embodiment of the present invention.

Therefore, according to the second exemplary embodiment of the present invention, the light source 100 is disposed on the vertical rotation axis b to irradiate light toward the phosphor 210 and an upper end or a lower end of the first support 400 and the second support 500. In certain embodiments, it is preferable that a coupled part between lower ends of the first support 400 and the second support 500 may be provided with a through hole 521 along the vertical rotation axis b so as to allow the irradiated light to be incident on the phosphor 210.

As the light source 100 is disposed to make light incident toward the phosphor 210 along the vertical rotation axis b and irradiate light, as illustrated in FIG. 5, the moving path c of light may be formed in parallel with the vertical rotation axis b and stable irradiation may be made even when the reflector 200 rotates.

According to the lamp for a vehicle having the above structure, even though the light source and the reflector are separated from each other, the light from the light source reaches a predetermined position at all times, thereby enabling the reflector to perform the independent aiming.

Further, the light source and the reflector are independently separated from each other, thereby increasing the freedom of the shape implementation of the reflector and enlarging the implementation width of the layout at the time of installation.

Further, even though any one of the reflector and the light source has a problem, the reflector and the light source may be separately replaced and repaired, thereby saving costs.

Further, the reflector may be independently adjusted to increase the fluctuation width and implement the irradiation angle having wide and various forms and the irradiation shape.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. A lamp for a vehicle, the lamp comprising:
   a reflector configured to reflect received light and to rotate with respect to at least one rotation axis to control an irradiation angle;
   a light source positioned outside the reflector spaced apart from the reflector and configured to generate light to be incident on the reflector, wherein the light from the light source forms a set moving path;
   a phosphor disposed in the moving path of the light from the light source and configured to receive light including the light from the light source and output, to the reflector, light having a different wavelength from that of the light from the light source, wherein the reflector is configured to rotate with respect to a horizontal rotation axis and a vertical rotation axis; and
   a reflecting body disposed on the vertical rotation axis and configured to reflect the light received from the light source to the phosphor.

2. The lamp of claim 1, wherein the light source generates a laser beam.

3. The lamp of claim 1, wherein the moving path of the light from the light source intersects or is parallel with any one of the rotation axes.

4. The lamp of claim 1, wherein the phosphor is provided at an intersecting point between the horizontal rotation axis and the vertical rotation axis of the reflector.

5. The lamp of claim 1, wherein the light reflected from the reflecting body is incident on the phosphor along the vertical rotation axis.

6. The lamp of claim 1, wherein the light source and the reflector are separate components that can each be installed independently.

7. A lamp for a vehicle, the lamp comprising:
   a reflector configured to reflect received light and to rotate with respect to at least one rotation axis to control an irradiation angle;
   a light source positioned outside the reflector spaced apart from the reflector and configured to generate light to be incident on the reflector, wherein the light from the light source forms a set moving path;
   a phosphor disposed in the moving path of the light from the light source and configured to receive light including the light from the light source and output, to the reflector, light having a different wavelength from that of the light from the light source, wherein the reflector is configured to rotate with respect to a horizontal rotation axis and a vertical rotation axis;
   a first support configured to be rotatably-coupled with left and right ends of the reflector to form the horizontal rotation axis; and
   a second support configured to be rotatably-coupled with an upper end of the first support at an upper coupled part and with a lower end of the first support at a lower coupled part to form the vertical rotation axis,
   wherein the light source is disposed on the vertical rotation axis to irradiate light toward the phosphor, and
   wherein the upper coupled part or the lower coupled part is provided with a through hole along the vertical rotation axis so as to allow the irradiated light to be incident on the phosphor.

* * * * *